United States Patent [19]
Fierfort

[11] 3,721,121
[45] March 20, 1973

[54] METHODS AND APPARATUS FOR INVESTIGATING MULTIPHASIC WELL FLUIDS

[75] Inventor: Claude Fierfort, Lozere, France
[73] Assignee: Schlumberger Technology Corporation, New York, N.Y.
[22] Filed: Nov. 15, 1971
[21] Appl. No.: 198,848

[30] Foreign Application Priority Data
Nov. 20, 1970  France..................7041689

[52] U.S. Cl. .....................73/155, 73/61 R
[51] Int. Cl. ...........................E21b 47/00
[58] Field of Search........73/155, 61R, 324/61 QS, 61 QL

[56] References Cited
UNITED STATES PATENTS

| | | | |
|---|---|---|---|
| 3,133,437 | 5/1964 | Remke et al. | 324/61 R X |
| 3,279,249 | 10/1966 | Tocanne | 324/61 R X |

Primary Examiner—Jerry W. Myracle
Attorney—Ernest R. Archambeau, Jr. et al.

[57] ABSTRACT

In the new and improved methods and apparatus disclosed herein for determining the volumetric proportions of the different phases of well fluids, a fluid-investigating tool adapted for positioning in a production well is provided with an enclosed chamber which is continuously communicated with multiphasic well fluids exterior of the tool by upper and lower fluid siphon passages which isolate the chamber to allow fluids of different densities to remain in a segregated condition. A measuring device is cooperatively arranged within the fluid chamber for detecting the interface of segregated production fluids within the chamber to provide indications at the surface which are representative of the phase mixture or volumetric composition of the well fluids at the depth of investigation. Unique techniques and apparatus are also provided for calibrating the sampling tool from the surface to assure continued accurate measurements.

23 Claims, 10 Drawing Figures

PATENTED MAR 20 1973 3,721,121

PATENTED MAR 20 1973 3,721,121

METHODS AND APPARATUS FOR INVESTIGATING MULTIPHASIC WELL FLUIDS

Various techniques have, of course, been employed heretofore for determining the phase mixture of the fluids being produced from various depths in a production well. For example, individual samples at various depths of interest in a well bore and returning the sampling tool to the surface for examination of each sample. It will, of course, be recognized that such samples are often unrepresentative of the true phase composition or mixture of the production fluids flowing at the sampling depth. Moreover, since it requires considerable time to secure a number of individual samples, changing well conditions during a prolonged sampling operation will often make it difficult to properly correlate the results of such multiple tests.

Another typical phase-measuring tool is provided with a selectively expansible packer and is so arranged that when the tool is positioned at a selected depth in a well bore, the upwardly flowing well fluids will be diverted through a sampling chamber containing typical electrical sensors for continuously indicating the phase composition of the production fluids. Alternatively, tools of a similar design are often arranged for selectively trapping a sample of the flow production fluids. After the different fluids have segregated, measurements are made from the surface which are indicative of the location of the interface between the phases so that the proportion of each phase composing the trapped sample can be readily determined. It will, however, be appreciated that such measuring tools present significant flow restrictions which may unduly modify the flow conditions of the well under investigation so as to affect the accuracy of these measurements. Moreover, the measurements obtained with measuring tools of this nature are often subject to error at high flow rates as well as whenever the well fluids have a relatively-high proportion of water.

Accordingly, it is an object of the present invention to provide new and improved methods and apparatus for r reliably determining the composition of flowing multiphase production fluids in a well bore independently of the flow rates of the several fluids.

This and other objects of the present invention are attained by new and improved fluid-measuring apparatus having a fluid-segregating chamber which is coupled to oppositely directed upper and lower siphon passages respectively arranged for providing continuous fluid communication between the upper and lower portions of the chamber and the exterior of the tool body as well as isolating the chamber so that the fluids therein will remain in a segregated condition. Sensing means are cooperatively arranged for determining the relative volumes of the production fluids of different specific gravities which have entered the chamber to determine the phase composition of the fluids flowing in the well bore exterior to the tool. New and improved methods and apparatus are also provided for calibrating the volume-measuring means from the surface for assuring the continued accuracy of the downhole measurements.

The novel features of the present invention are set forth with particularity in the appended claims. The invention, together with further objects and advantages thereof, may be best understood by way of the following description of exemplary apparatus and methods employing the principles of the invention as illustrated in the accompanying drawings, in which:

Figure 1:
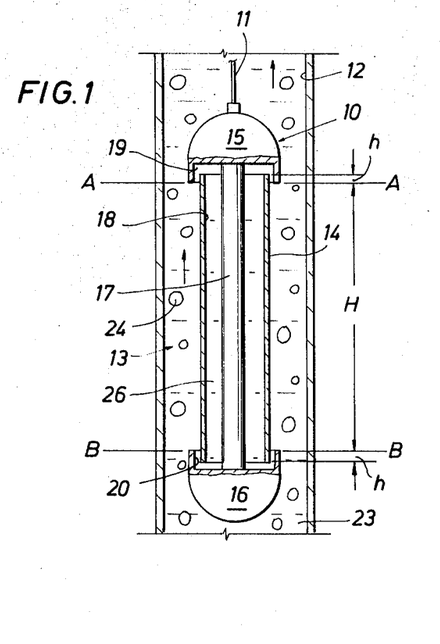
FIGS. 1 and 2 schematically depict new and improved apparatus of the present invention as it is being operated within a typical production well.
Figure 2:
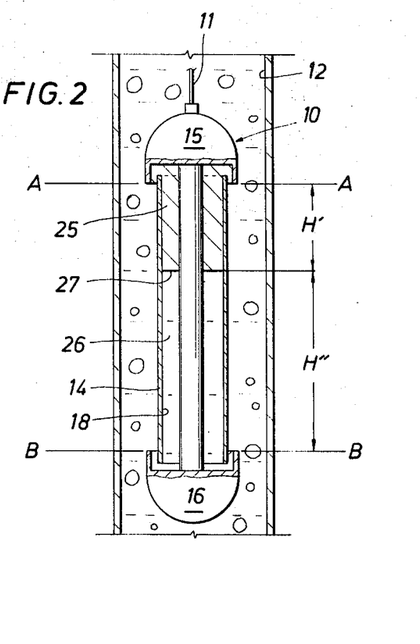

Turning now to FIGS. 1 and 2, a new and improved measuring tool 10 arranged in accordance with the principles of the present invention is schematically depicted as it will appear while suspended by a suitable shielded electrical cable 11 in a well bore 12 through which multiphase production fluids are flowing upwardly. The tool 10 includes an elongated body 13 which is cooperatively arranged for carrying an upright tubular member 14 having its upper and lower ends respectively disposed within opposed cup-shaped body portions 15 and 16 which are coupled together by an elongated column 17 of a smaller size extending through the tubular member and defining therebetween an enclosed annular chamber 18 of known dimensions. As schematically illustrated, the upper and lower body portions 15 and 16 are respectively sized and disposed in relation to the opposite ends of the tubular member 14 for defining an upper siphon passage 19 and a lower inverted siphon passage 20 cooperatively providing isolating fluid communication paths between the upper and lower ends of the chamber 18 and the exterior of the body 13. For reasons which will be subsequently explained, the upper siphon passage 19 is cooperatively arranged for creating a siphoning action between the upper portion of the chamber 18 and the well bore 12 exterior of the chamber. Similarly, the inverted lower siphon passage 20 is cooperatively arranged for creating a siphoning action between e lower portion of the chamber 18 and the well bore 12.

Figure 3A:
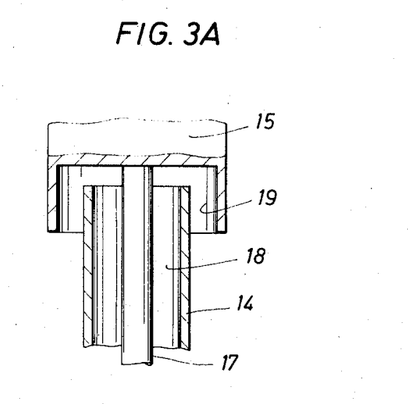
FIGS. 3A and 3B respectively show alternative constructional details of the fluid-investigating apparatus of the present invention.
Figure 3B:
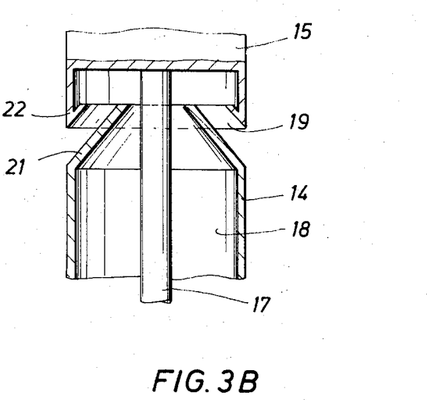

It will, of course, be appreciated that various mechanical designs can be employed for providing the upper and lower siphon passages 19 and 20. For example, as depicted in FIGS. 1 and 3A, the ends of the tubular member 14 may be simply arranged within the cylindrical body members, as at 15, and spaced sufficiently therefrom to define the annular siphon passages, as at 19. Alternatively, as illustrated in FIG. 3B, the ends of the tubular member 14 may be cooperatively shaped as truncated cones as at 21; and each cup-shaped body member, as at 15, may have its skirt portion 22 surrounding the conical end portion 21 complementally shaped for defining the inclined annular siphon passage 19. It will, of course, be appreciated that any arrangement of such members which provides true siphon passage, as at 19 and 20, will be suitable for accomplishing the objects of the present invention. It should, however, be noted that the form of the siphon passages 19 and 20 and the positioning of their respective outlets may affect the rapidity with which fluid equilibrium is established in the measuring chamber 18 whenever there is a change in the nature of the well fluids. It has been found that with the siphon passage 19 and 20 formed as shown in FIGS. 3A and 3B, equilibrium is quickly established in the measuring chamber 18 so that as the tool 10 is moved continuously through the well bore 12, a fluid interface is maintained therein for providing accurate measurements which are independent of the flow rates of the several phases of the fluids in the well bore.

Referring again to FIGS. 1 and 2, it will, of course, be appreciated that when the new and improved tool 10 is positioned in the well bore 12, the measuring chamber 18 will be continuously filled with the well fluids. If, for example, the flow well fluids are diphasic and are essentially composed of water, as at 23, in which slugs of oil, as at 24, are distributed, samples of each of these two fluid phases will enter the chamber 18; and, once they become quiescent, the fluids will be segregated in the chamber in accordance with their relative densities. Thus, oil being lighter than water, the slugs of oil 24 entering the chamber 18 will combine, as at 25, in the upper portion of the chamber and the heavier water 23 will accumulate, as at 26, in the lower portion of the chamber.

To better appreciate the theory of operation of the new and improved measuring tool 10, assume that when the tool is first introduced into the well bore 12 the measuring chamber 18 is completely filled with the heavier fluid phase such as the collected water depicted at 26 in FIG. 1. However, as will be subsequently shown, where the flowing well fluids include a lighter fluid phase such as the oil slugs 24, these lighter fluids will enter the enclosed chamber 18 by way of the upper siphon passage 19 as the heavier fluids, such as the collected water 26, leave the chamber of the lower siphon passage 20. In the situation illustrated in FIG. 1, the pressures of the well fluids exterior of the tool 10 and within the chamber 18 at the two elevations or horizontal planes A and B respectively cutting the exterior ends of the siphon passages 19 and 20 can be respectively expressed in the metric system as follows:

EXTERIOR OF THE TOOL $$P_2 - P_1 = \rho_m g H + \Delta P \qquad (Eq. 1)$$

where, $P_1$ = pressure of the well bore fluids exterior of the tool at the plane A;

$P_2$ = pressure of the well bore fluids exterior of the tool at the plane B;

$\rho_m$ = average or mean density of the diphasic well bore fluids;

$g$ = acceleration of gravity;

$H$ = distance between the planes A and B; and $\Delta P$ = pressure drop due to friction trough the section of the well bore between the planes A and B.

INTERIOR OF THE CHAMBER $$P'_2 - P'_1 = \rho_\delta g H + P_{\theta_1} + P_{\theta_2} \qquad (Eq\ 2)$$

where, $P'_1$ = pressure of the fluids within the chamber at the plane A;

$P'_2$ = pressure of the fluids within the chamber at the plane B;

$\rho_\delta$ = density of the heavy phase fluid in the chamber; $P_{\theta_1}$ = dynamic pressure increase due to the flow past the upper siphon passage; and $P_{\theta_2}$ = dynamic pressure reduction due to the flow past the lower siphon passage.

It will, of course, be recognized that at low flow rates, the values of the terms $\Delta P$, $P_{\theta_1}$ and $P_{\theta_2}$ are negligible. It has been found, moreover, that these terms can be reasonably disregarded at even high flow rates. Accordingly, by comparison of Equations 1 and 2, it will be appreciated that since $\rho_\delta$ greater than $\rho_m$, the hydrostatic pressure imposed within the chamber 18 at plane B ($P'_2 - P'_1$) will be greater than the hydrostatic pressure at plane B exterior of the tool 10 ($P_2 - P_1$). These unbalanced pressures will, therefore, develop a downwardly moving flow of the heavier fluids 26 within the chamber 18 which will expel these heavier fluids out of the chamber by way of the lower siphon passage 20 as bubbles of the lighter well bore fluids 24 enter the chamber through the upper siphon passage 19 and are collected as at 25. This circulation will, of course, continue only so long as this pressure unbalance exists. Thus, once these interior and exterior pressures are balanced, it will be appreciated that the chamber 18 will be filled with the lighter and heavier phases of the diphasic well fluids which will be segregated as shown at 25 and 26 in FIG. 2.

Once the diphasic fluids 25 and 26 are segregated, it can be shown that the respective volumes of these fluid samples in the chamber 18 will be substantially proportional to the concentration of the diphasic fluids 23 and 24 in the well bore 12 immediately exterior of the new and improved tool 10. Since the cross-sectional area of the tubular member 14 is uniform, the heights, H' and H'', of the fluids 25 and 26 will, of course, be representative of their respective volumes. The condition of equilibrium between the interior and exterior of the chamber 18 can be expressed as:

$$\rho_m g H = -h \rho_l g + (h+H') \rho_l g + (h+H'') \rho_l - h \rho_\delta g \quad (Eq.\ 3)$$

where, $\rho_l$ = density of the light-phase fluid in the chamber;

$\rho_\delta$ = density of the heavy-phase fluid in the chamber;

$h$ = height of siphon passages;

$H'$ = height of the light-phase fluid; and $H''$ = height of the heavy-phase fluid. Regrouping, Equation 3 becomes.

$$\rho_m = H'/H\ (\rho_l) + H''/H\ (\rho_\delta) \qquad (Eq.\ 4)$$

It will, of course, be appreciated that the average density, $\rho_m$, of the well fluids is also equal to:

$$\rho_m = E_l \rho_l + E_\delta \rho_\delta \qquad (Eq.\ 5)$$

where, $E_l$ = concentration of light-phase fluids; and $E_\delta$ = concentration of heavy-phase fluids. Thus, comparing Equations 4 and 5, it will be seen that:

$$E_l \cong H'/H \text{ and} \qquad (Eq.\ 6)$$

$$E_\delta \cong H''/H. \qquad (Eq.\ 7)$$

Hereagain, as previously mentioned, the influence of the dynamic pressures of the well fluids flowing past the siphon passages 19 and 20 will have counteracting negligible effects on the heights, $H'$ and $H''$, of the two fluids 25 and 26 segregated in the chamber 18. Thus, although there will be not necessarily be an absolute correspondence of the level of the interface 27 in the chamber 18 to the true concentrations of these fluids, the position of the fluid interface has been found to give sufficiently accurate measurements of these concentrations independently of the flow rates of the fluid phases 23 and 24 in the well bore 12. Appropriate correction factors can, of course, be developed empirically for obtaining more accurate correlations between the concentration measurements and their relation to the position of the interface at high flow rates in the well bore 12.

It will be recognized, therefore, that the siphon passages 19 and 20 are of paramount importance in accomplishing the objects of the present invention. Form the previous discussion, it will be understood that the siphon passages 19 and 20 cooperatively isolate the measuring chamber 18 so that the quiescent fluid samples 25 and 26 will remain segregated therein. However, since each of the siphon passages 19 and 20 will respectively have only portions of the lighter and heavier phases 25 and 26 trapped in the bends of the passages, these trapped fluids will readily transmit fluid pressures between the fluid chamber 18 and the well bore 12. Thus, by virtue of the unique arrangement of these passages 19 and 20, any change in the phase composition of the well fluids 23 and 24 will cause an unbalanced condition such as expressed by Equations 1 and 2 which will develop a compensation exchange of fluids between the chamber 18 and the well bore 12 until the conditions defined in Equation 3 are again restored. It will be realized, therefore, that both the upper and lower siphon passages 19 and 20 are necessary for assuring the maintenance of the stable interface 27.

Figure 4:
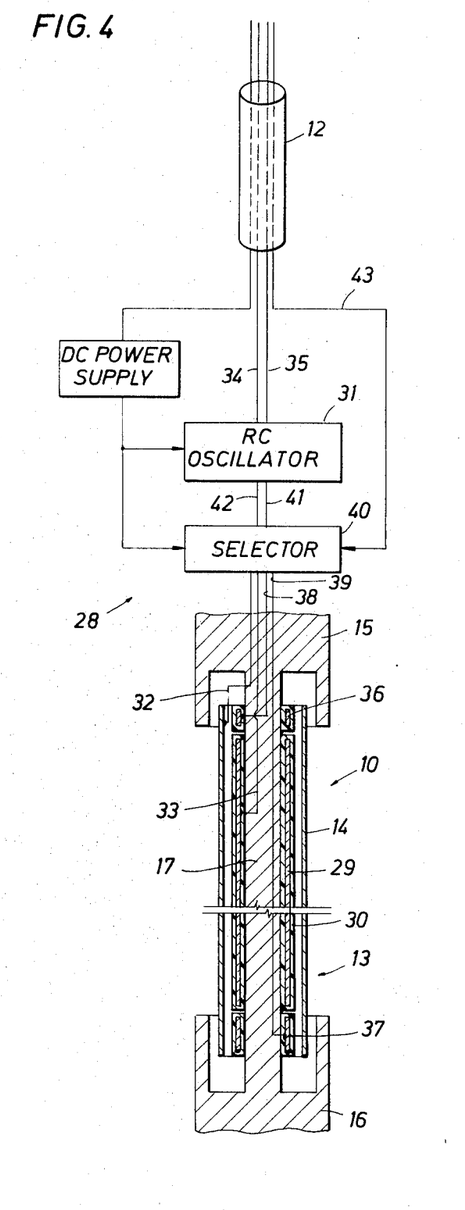
FIG. 4 schematically illustrates one arrangement of interface-detecting means in a fluid phase measuring tool arranged in accordance with the principles of the present invention.

It will, of course, be appreciated that to determine the volumes of the fluids in the chamber 18, means must also be provided for detecting some characteristic that is a function of these respective volumes. In the preferred manner of accomplishing this, means are provided for determining the position of the interface, as at 27, between the lighter-phase fluid sample 25 and the heavier-phase fluid sample 26 collected in the segregating chamber. Accordingly, as shown in FIG. 4, the tool 10 is provided with interface-detecting means 28 which are preferably arranged in accordance with French Pat. No. 1,321,545 applied for on Feb. 7, 1962, and its addition, Ser. No. 82,780 applied for on Dec. 14, 1962. Thus, in keeping with this patent, the tubular member 14 is preferably formed of metal to serve as one capacitor element; and a second tubular member 29 is mounted around the central column 17 and electrically isolated therefrom for providing a second electrical capacitor element. To electrically isolate the inner capacitor element 29 from electrically conductive well fluids in the segregating chamber 18, an insulating sleeve, as at 30, of a non-wetting electrical insulating material such as polytetrafluorethylene, for example, is disposed around the electrically isolated inner element.

The interface-detecting means 28 further include a RC oscillator 31 appropriately mounted within the tool 10 and connected, as by electrical conductors 32 and 33, to the capacitor elements 14 and 29 for transmitting signals to the surface through one or more cable conductors 34 and 35 which are representative of frequency variations of the oscillator in response to changes in the electrical capacitance between the inner and outer capacitor elements. It will, of course, be appreciated that since well fluids of different compositions have different dielectrical properties, the electrical capacitance of the capacitor elements 14 and 29 will vary in relation to the nature of these fluids as well as to the respective heights, $H'$ and $H''$, of the fluids 25 and 26 in the chamber 18. Thus, for given fluids, the level of the interface 27 between the fluids 25 and 26 will determine the output frequency of the RC oscillator 31.

Since there can be a considerable difference in the chemical compositions of well fluids, the new and improved tool 10 further includes means for calibrating the oscillator 31 while the tool is positioned in the well bore 12. As depicted in FIG. 4, in one embodiment of means for calibrating the interface-detecting means 28, a pair of short, tubular capacitor elements 36 and 37 are coaxially disposed around the central body member 17 adjacent to the opposite ends of the elongated tubular capacitor 29 and respectively connected by electrical conductors 38 and 39 is a selector control or multiposition switch 40 which is operatively coupled by conductors 41 and 42 to the RC oscillator 31 and adapted for control from the surface by way of a cable conductor 43. It will be appreciated, therefore, that by selectively operating the selector switch 40, the RC oscillator 31 can be alternatively connected to either of the two calibration capacitor elements 36 or 37 as well as to the main interface-detecting capacitor element 29. In this manner, when the upper calibration capacitor element 36 is connected to the RC oscillator 31, the calibration signal which is obtained will be representative of the response of the main capacitor elements 14 and 29 to the lighter-phase fluids 25 collected in the upper end of the segregation chamber 18. Conversely, a calibration measurement representative of the effect of the heavier fluids 26 in the lower portion of the chamber 18 can be selectively obtained by operating the selector circuit 40 so as to couple the RC oscillator 31 to the lower calibration capacitor 37.

Figure 5A:
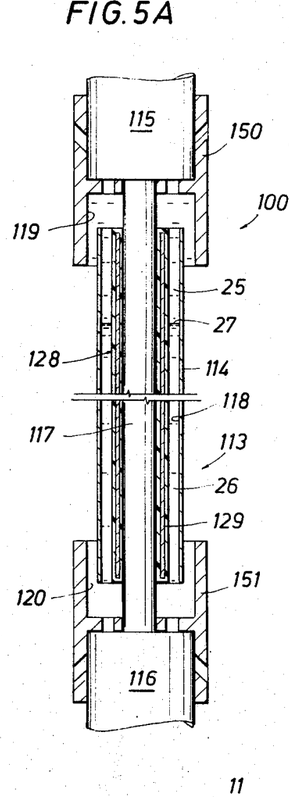
FIGS. 5A–5C respectively illustrate another embodiment of a new and improved measuring tool of the present invention and show its usual operation as well as how the tool is calibrated in accordance with the methods of the present invention.
Figure 5B:
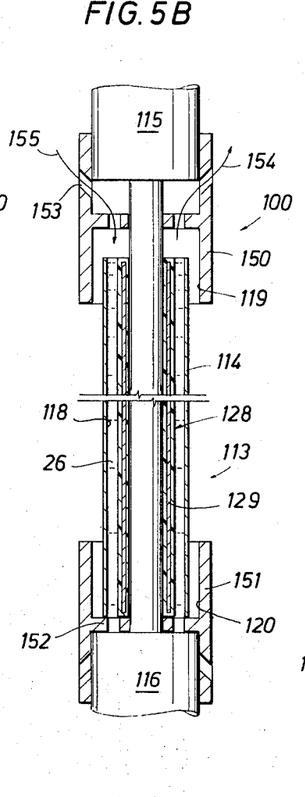
Figure 5C:
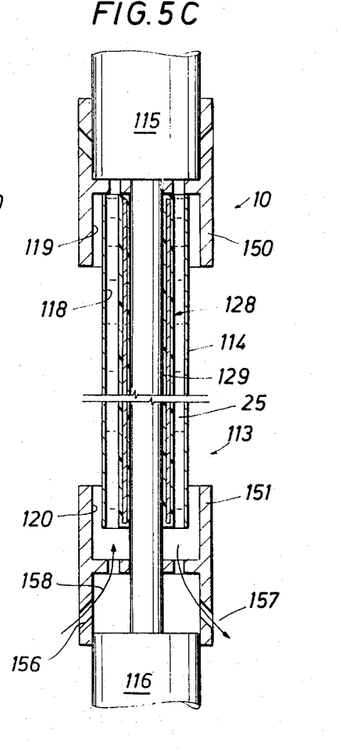

Turning now to FIGS. 5A–5C, a schematic representation is shown of an alternative embodiment of a new and improved fluid-investigating tool 100 which is also arranged in accordance with the principles of the present invention. Since the investigating tool 100 is similar or identical in most respects to the tool 10, where appropriate the same reference numerals are employed for the common elements except that the numerals designating the common elements have been increased by a factor of "100" to facilitate the description of the tool 100. As will be realized by comparison of their respective drawings, the paramount distinction between the tool 10 and the tool 100 is that in the former tool, calibration measurements are obtained by means of the selector circuit 40 and the two calibration capacitor elements 36 and 37; and, in the latter tool, calibration measurements are obtained by selectively filling the measuring chamber 118 with only one fluid phase at a time so that the response of the capacitor elements 114 and 129 to this particular fluid alone can be selectively determined. Thus, the selector switch 40 and the two calibrating capacitor elements 36 and 37 are not required for calibrating the interface-detecting means 128 of the fluid-investigating tool 100.

Accordingly, as illustrated in FIGS. 5A–5C, the tool 100 is cooperatively arranged so that the siphoning actions through the upper and lower siphon passages 119 and 120 can be selectively controlled from the surface so that the interface-detecting means 128 can be precisely calibrated for determining the position of the interface 27 between the lighter-phase and heavier-phase well fluids 25 and 26. To accomplish this selective control, the upper and lower siphon passages 119 and 120 are respectively defined by a pair of similar or identical tubular members 150 and 151 which are slidably mounted around the spaced enlarged body portions 115 and 116 in such a fashion as to encompass the upper and lower ends of the upright tubular member 114 which is slidably mounted around the central body member 117. As depicted, the slidable sleeves 150 and 151 as well as the capacitor elements 114 and 129 are respectively adapted for longitudinal movement in relation to the tool body 113; and they are respectively interconnected in such a manner that these several movable members can be selectively shifted upwardly and downwardly in relation to the tool body between a normal intermediate position as depicted in FIG. 5A and lower and upper positions as respectively depicted in FIGS. 5B and 5C.

By means which will subsequently be explained by reference to FIGS. 6A and 6B, the tubular capacitor elements 114 and 129 as well as the slidable sleeves 150 and 151 are cooperatively arranged so that when they are in their normal positions as illustrated in FIG. 5A, there will be siphoning communication between the fluid chamber 118 and the exterior of the tool 100 by way of the upper and lower siphon passages 119 and 120. In this normal position of the several movable elements 114, 129, 150 and 151, the tool 100 will perform the measuring operation previously described with respect to FIGS. 1 and 2.

On the other hand, to calibrate the response of the interface-detecting means 128 to, for example, the heavier-phase well fluids 26, the several elements 114, 129 and 150 are cooperatively arranged to be shifted downwardly along the tool body 113 to their respective positions illustrated in FIG. 5B. As seen there, the lower sleeve 151 has remained in its normal position and the capacitor elements 114 and 119 as well as the upper sleeve 150 have been moved downwardly in relation to the tool body 113 to position the lower end of the elongated tube 114 in sealing engagement against an inwardly directed flange 152 provided around the mid portion of the lower sleeve. Once the several members 114, 129 and 150 have been moved to the position illustrated in FIG. 5B, ports as at 153 on the upper portion of the upper sleeve are uncovered for interrupting any siphoning action that would otherwise occur through the upper siphon passage 119 to allow lighter-phase fluids 25 in the measuring chamber 118 to escape through the ports (as shown by the arrows 154) as these lighter fluids are displaced by the heavier fluids 26 (as shown by the arrows 155) entering the measuring chamber. It will, therefore, be appreciated that once the measuring chamber 118 has been completely filled with only the heavier-phase fluids 26, the interface detector 128 can be readily calibrated since its oscillator frequency will be representative of the dielectrical properties of the heavier-phase well fluids alone.

Conversely, when it is desired to determine the response of the new and improved tool 100 to the lighter-phase well fluids 25, the several members 114, 129 and 151 are moved upwardly in relation to the tool body 113 so as to close the upper end of the measuring chamber 118 and open one or more ports, as at 156, in the lower sleeve 151. Thus, as shown in FIG. 5C, with the several members 114, 129, 150 and 151 in their respectively illustrated positions, siphoning action in the lower inverted siphon passage 120 will now be interrupted so that the heavier-phase well fluids 26 in the measuring chamber 118 will be readily drained therefrom (as shown by the arrows 157) and be replaced by the lighter-phase fluids 25 entering the chamber (as shown by the arrows 158). Hereagain, once the measuring chamber 118 is filled with the lighter-phase well fluids 25, a corresponding calibration measurement can be obtained by determining the output frequency of the interface-detecting means 128 when it is known that only the lighter-phase well fluids are filling the measuring chamber.

Figure 6A:
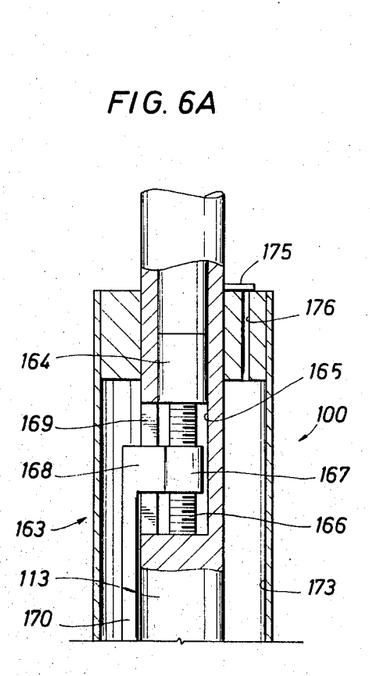
FIGS. 6A and 6B are successive elevation views in cross section of a detailed arrangement of the measuring tool shown in FIGS. 5A–5C.
Figure 6B:
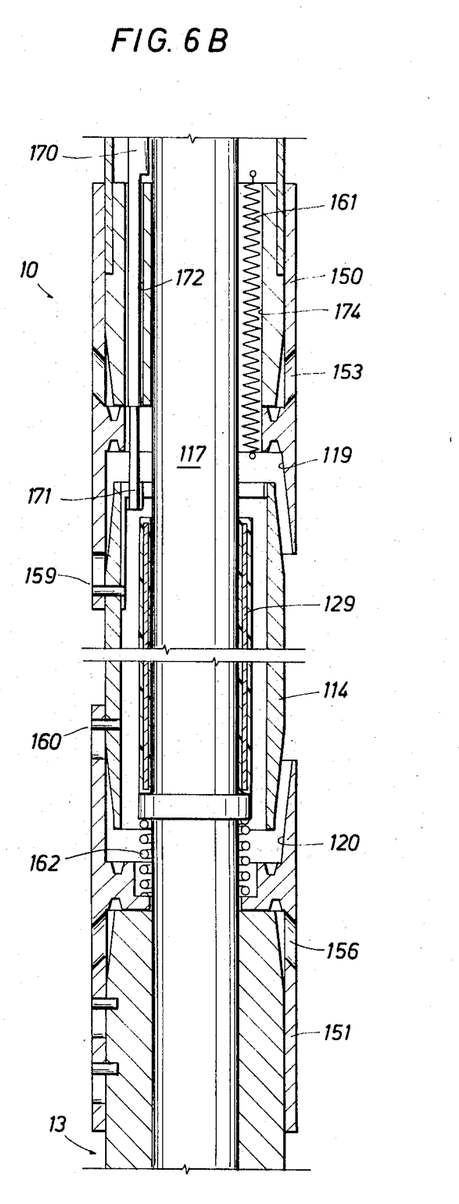

Turning now to FIGS. 6A and 6B, in the preferred manner of arranging the several movable elements 114, 129, 150 and 151 previously described in reference to FIGS. 5A–5C, the upper and lower sleeves 150 and 151 are respectively coupled to the upper and lower ends of the tubular capacitor member 114 by lost-motion connections such as at 159 and 160. To normally retain the sleeves 150 and 151 in their respective siphon-producing positions, biasing means, such as springs 161 and 162, are cooperatively coupled between the body 113 and the sleeves for urging the sleeves against the enlarged body portions 115 and 116. Thus, when the upper and lower sleeves 150 and 151 are in their respective normal positions as illustrated in both FIGS. 5A and 6B, an upward movement of the outer capacitor element 114 will carry the lower sleeve and the inner capacitor element 129 upwardly without producing a corresponding movement of the upper sleeve. Conversely, a downward movement of the tubular capacitor member 114 will move the upper sleeve 150 and the inner capacitor element 129 downwardly in relation to the tool body 113 but without producing a corresponding downward movement of the lower sleeve 151.

To accomplish the selective movement of the outer tubular member 114, the tool 100 further includes actuating means 163 cooperatively arranged for selective control from the surface. In the preferred manner of arranging the actuating means 163, a selectively reversible electric motor 164 mounted in a chamber 165 in the upper portion of the body 113 is provided with a rotatable threaded shaft 166 cooperatively carrying a traveling nut 167 which is adapted for vertical movement either upwardly or downwardly along the shaft depending upon the direction in which the motor is rotated. A lateral extension 168 on the traveling nut 167 is slidably disposed within a longitudinal slot 169 in the body 113 for preventing the nut from turning as the shaft 166 is rotated. To couple the traveling nut 167 to the tubular capacitor element 114, an elongated rod 170 is secured, as at 171, to the upper end of the tubular element and extended upwardly through a longitudinal passage 172 in the body 113 to the outer end of the extension 168.

It will be appreciated that it may be particularly desirable to determine the composition of diphasic well liquids without having entrained gases present. Accordingly, in the preferred embodiment of the tool 100, a gas collection chamber 173 is provided in the tool body 113 and communicated with the upper portion of the upper siphon passage 119 by means such as a longitudinal passage 174 carrying the spring 161. Thus, gas which would otherwise collect in the upper portion of the measuring chamber 118 will be transferred to the collection chamber 173 without interfering with the siphoning action of the upper siphon passage 119. To bleed accumulated gases from the collection chamber 173, a normally closed check valve, such as a ball valve or a flapper valve 175, is mounted on the body 113 and cooperatively arranged for selectively controlling the passage of gases from the chamber through an exhaust passage 176. The check valve 175 will, of course, be cooperatively arranged to momentarily open whenever the pressure of gases in the collection chamber 173 exceeds the hydrostatic pressure of the well fluids in the well bore 12 and thereby maintain the pressure in the collection chamber at a desired level. It should be noted that although the above-described gas-eliminating system will leave only the two liquids 25 and 26 in the chamber 118, Equation 1 shows that the presence of small amounts of gas in the well fluids will have at best only a minimal effect upon the accuracy of the determination of the relative proportions of the two liquid phases.

Accordingly, it will be appreciated that the present invention has provided new and improved methods for determining the composition of a mixture of multiphasic well fluids flowing in a well bore without unduly affecting the flow conditions in the well. To achieve these objects, the methods of the invention are practiced by continuously introducing samples of only a heavy-phase well fluid into the lower portion of an enclosed chamber and samples of only a light-phase well fluid into the upper portion of this chamber for segregating these two fluid phases within the chamber into separate portions respectively having a volume which is representative of the relative volumetric fraction of that fluid in the well fluid mixture flowing through the well bore. Thus, by measuring a function which is characteristic of the relative volumes of each fluid phase in the chamber, the volumetric composition of the well fluids can be determined.

The apparatus of the present invention is cooperatively arranged to define a segregating chamber having an upper siphon passage and an inverted siphon passage respectively communicated with the upper and lower portions of the chamber for continuously supplying samples of each fluid phase of a mixed well fluid to the chamber without disturbing the segregated fluid phases in the chamber. Means are further provided for determining the relative volumes of each of the fluid samples collected in the segregating chamber.

While only particular embodiments of the present invention and modes of practicing the invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for determining the volumetric composition of a mixture of heavier-phase and lighter-phase well fluids flowing through a well bore and comprising the steps of: introducing a first sample of only said lighter-phase well fluids from a higher well bore elevation into the upper portion of an enclosed chamber and introducing a second sample of only said heavier-phase well fluids from a lower well bore elevation into the lower portion of said chamber for segregating said samples therein into distinct portions; and measuring at least one function which is representative of the volume of at least one of said segregated samples collected in said chamber for determining the volumetric proportions of said lighter-phase well fluids and of said higher-phase well fluids flowing in said well bore between said well bore elevations.

2. The method of Claim 1 further including the step of: isolating said segregated sample of said lighter-phase well fluids from said mixture of flowing well fluids with only a portion of said first sample and isolating said segregated sample of said heavier-phase well fluids from said mixture of flowing well fluids with only a portion of said second sample for respectively communicating said mixture at said upper and lower bore elevations with said chamber to allow the volumes of said samples to vary in accordance with changes in the volumetric proportions of said lighter-phase and heavier-phase well fluids flowing in said well bore between said elevations.

3. The method of claim 2 wherein said lighter-phase well fluids include a substantial volume of oil and said heavier-phase well fluids include a substantial volume of water.

4. The method of claim 2 wherein said lighter-phase well fluids include a substantial volume of oil and a minor volume of gas and said heavier-phase well fluids include a substantial volume of water and including the further step of: removing samples of said gas collected in said enclosed chamber so that said measured function will be representative of the volumetric proportions of only said oil and said water flowing in said well bore.

5. The method of claim 1 wherein said measured function is the position of the interface between said segregated samples in said chamber.

6. A method for determining the volumetric composition of a mixture of heavier-phase and lighter-phase well fluids flowing through a well bore and comprising the steps of: positioning an enclosed chamber having an upright first siphon passage in communication with the upper portion of said chamber and an inverted second siphon passage in communication with the lower portion of said chamber into said well bore for simultaneously introducing a first sample of only said lighter-phase fluids from a higher well bore elevation into said chamber and introducing a second sample of only said heavier-phase fluids from a lower well bore elevation into said chamber; and after said first and second samples have segregated in said chamber in accordance with their relative densities, measuring at least one function which is representative of the volume of at least one of said segregated samples collected in said chamber for determining the volumetric proportions of said lighter-phase well fluids and of said higher-phase well fluids flowing in said well bore between said well bore elevations.

7. The method of claim 6 further including the step of: periodically measuring at least one characteristic of said lighter-phase well fluids then included in said first sample in said chamber for calibrating measurements of said one function.

8. The method of claim 6 further including the step of: periodically measuring at least one characteristic of said heavier-phase well fluids then included in said second sample in said chamber for calibrating measurements of said one function.

9. The method of claim 6 wherein said first and second siphon passages remain open for respectively collecting only a portion of said first and second samples in said first and second siphon passages for isolating said segregated samples from said mixture of well fluids without limiting the communication between said chamber and said mixture at said upper and lower well bore elevations to allow the volumes of said samples to vary in accordance with changes in the volumetric proportions of said lighter-phase and heavier-phase well fluids flowing in said well bore between said elevations.

10. The method of claim 9 further including the step of: periodically closing said first siphon passage and bypassing said second siphon passage for draining said second sample from said chamber and refilling said chamber with only said lighter-phase well fluids; and, thereafter, measuring at least one characteristic of said lighter-phase well fluids then filling said chamber for calibrating measurements of said one function.

11. The method of claim 9 further including the step of: periodically closing said second siphon passage and bypassing said first siphon passage for venting said first sample from said chamber and refilling said chamber with only said heavier-phase well fluids; and, thereafter, measuring at least one characteristic of said heavier-phase well fluids then filling said chamber for calibrating measurements of said one function.

12. Apparatus for determining the volumetric composition of mixed heavier-phase and lighter-phase well fluids flowing through a well bore and comprising: a body adapted for suspension in a well bore; means on said body defining an enclosed chamber adapted for segregating samples of well fluids of different densities; means on said body defining an upright first siphon passage communicating an upper portion of said chamber with the exterior of said body at a selected upper level; means on said body defining an inverted second siphon passage communicating a lower portion of said chamber with the exterior of said body at a selected lower level; and means on said body adapted for measuring at least one function which is representative of the volume of at least one sample of a well fluid of a given density segregated in said chamber to determine the volumetric proportions of such mixed well fluids flowing exterior of said body between said upper and lower levels.

13. The apparatus of claim 12 further including: means on said body adapted for periodically venting gases from said chamber.

14. The apparatus of claim 12 wherein said function-measuring means include means adapted for detecting the position occupied within said chamber by the fluid interface between segregated samples of well fluids of different densities in said chamber.

15. The apparatus of claim 12 further including: means adapted for periodically measuring at least one characteristic of lighter-phase well fluids occupying said upper portion of said chamber for calibrating measurements of said one function.

16. The apparatus of claim 12 further including: means adapted for periodically measuring at least one characteristic of heavier-phase well fluids occupying said lower portion of said chamber for calibrating measurements of said one function.

17. The apparatus of claim 12 further including: means adapted for periodically closing said first siphon passage and bypassing said second siphon passage for draining samples of heavier-phase well fluids from said chamber and refilling said chamber with only lighter-phase well fluids so that said measuring means can be calibrated with only lighter-phase well fluids in said chamber.

18. The apparatus of claim 12 further including: means adapted for periodically closing said second siphon passage and bypassing said first siphon passage for venting samples of lighter-phase well fluids from said chamber and refilling said chamber with only heavier-phase well fluids so that said measuring means can be calibrated with only heavier-phase well fluids in said chamber.

19. Apparatus adapted for determining the volumetric composition of mixed heavier-phase and lighter-phase well fluids flowing through a well bore and comprising: a body adapted for suspension in a well bore and having spaced upper and lower enlarged portions; a tubular member defining a fluid chamber mounted in an upright position between said enlarged body portions and having upper and lower ends respectively disposed adjacent to said upper and lower body portions; first means cooperatively arranged between said upper body portion and said upper end of said tubular member for defining an upright first siphon passage adapted for passing only lighter-phase well fluids between the upper portion of said fluid chamber and a well bore containing said body; second means cooperatively arranged between said lower body portion and said lower end of said tubular member for defining an inverted second siphon passage adapted for passing only heavier-phase well fluids between the lower portion of said fluid chamber and a well bore containing said body; and measuring means including sensor means arranged in said fluid chamber and cooperatively arranged for providing characteristic indications representative of the position of the fluid interface between samples of lighter-phase well fluids and heavier-phase well fluids respectively segregated in said upper and lower portions of said fluid chamber.

20. The apparatus of claim 19 wherein said measuring means further include: first and second sensor-calibrating means respectively disposed in said upper and lower portions of said fluid chambers; indicating means adapted for displaying said characteristic indications at the surface for determining the position of said interface; and switching means operable at the surface and adapted for selectively connecting said indicating means to said sensor means to obtain said characteristic indications as well as selectively connecting said indicator means to said sensor-calibrating means to selectively calibrate said sensor means.

21. The apparatus of claim 19 wherein said first means include a depending annular member on said upper body portion extending downwardly around said upper end of said tubular member so that said first siphon passage is annularly shaped; and said second means include an upright annular member on said lower body portion extending upwardly around said lower end of said tubular member so that said second siphon passage is annularly shaped.

22. The apparatus of claim 21 wherein said depending annular member and said upright annular member are fixed in relation to said body.

23. The apparatus of claim 21 wherein said depending annular member and said upright annular member as well as said tubular member are movable longitudinally between spaced upper and lower positions in relation to said body; and further including first and second lost-motion connection means respectively interconnecting said tubular member to said depending annular member and to said upright annular member and cooperatively arranged for carrying only said depending annular member downwardly upon downward movement of said tubular member and for carrying only said upright annular member upwardly upon upward movement of said tubular member; actuating means coupled to said tubular member and selectively operable for shifting said tubular member upwardly and downwardly between its said spaced positions; first sealing means between said upper end of said tubular member and said depending annular member for blocking said first siphon passage upon upward movement of said tubular member to its said upper position; second sealing means between said lower end of said tubular member and said upright annular member for blocking said second siphon passage upon downward movement of said tubular member to its said lower position; first port means on said depending annular member adapted for bypassing said first siphon passage upon downward movement of said depending annular member and said tubular member to its said lower position; and second port means on said upright annular member adapted for bypassing said second siphon passage upon upward movement of said upright annular member and said tubular member to its said upper position.

* * * * *